No. 701,258. Patented May 27, 1902.
W. P. CRANE.
PEANUT ROASTER AND POPCORN POPPER.
(Application filed Mar. 14, 1902.)
(No Model.) 2 Sheets—Sheet 1.
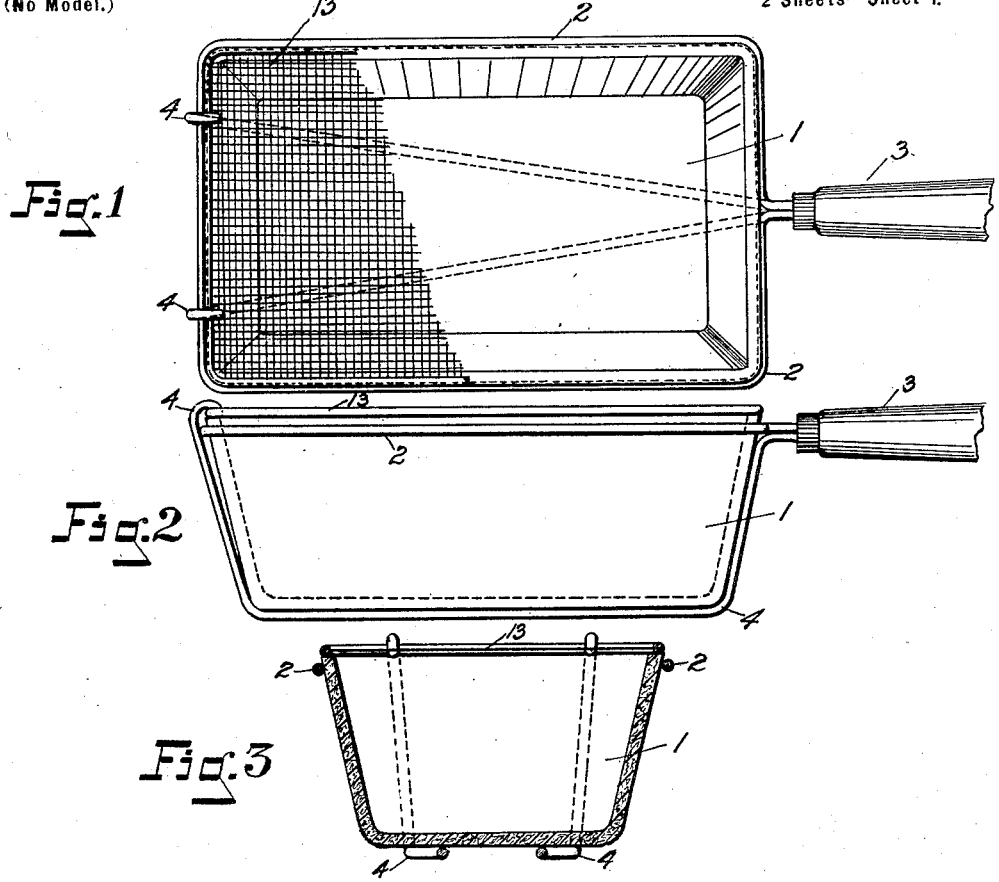
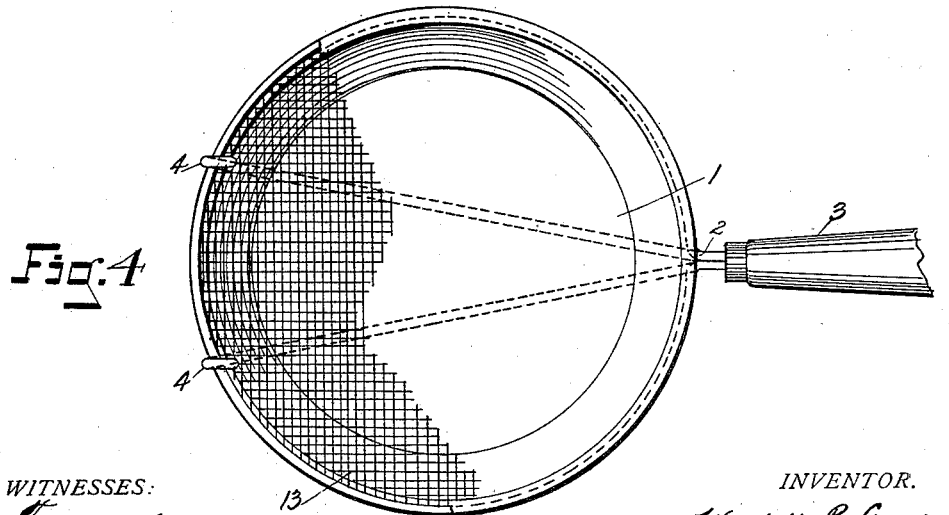
WITNESSES: INVENTOR.
Wendell P. Crane
BY
Francis M. Wright
ATTORNEY.

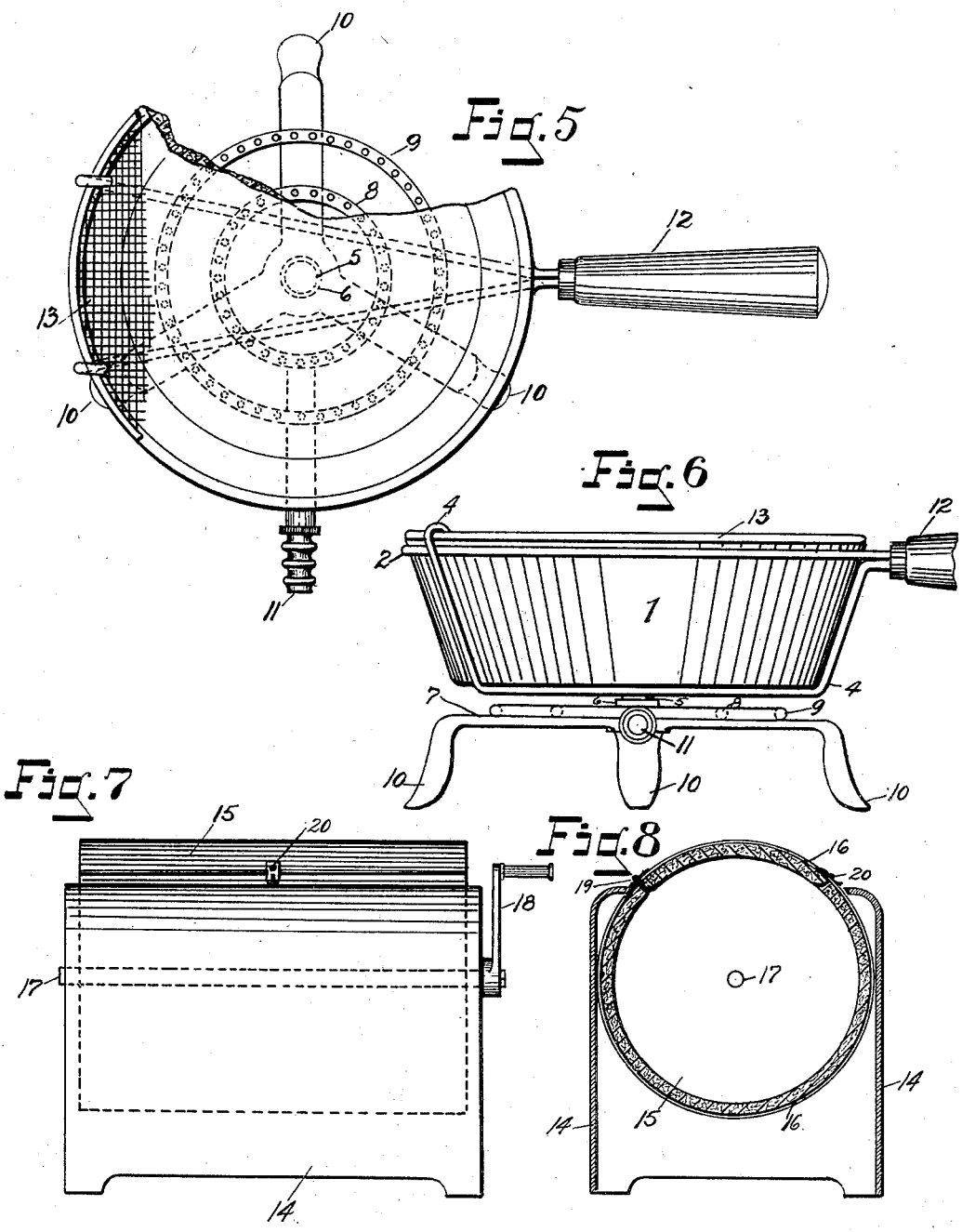

UNITED STATES PATENT OFFICE.

WENDELL P. CRANE, OF SAN FRANCISCO, CALIFORNIA, ASSIGNOR TO SIMON EMANUEL AND JAMES NORWOOD STEVENS, TRUSTEES, OF SAN FRANCISCO, CALIFORNIA.

PEANUT-ROASTER AND POPCORN-POPPER.

SPECIFICATION forming part of Letters Patent No. 701,258, dated May 27, 1902.

Application filed March 14, 1902. Serial No. 98,227. (No model.)

*To all whom it may concern:*

Be it known that I, WENDELL P. CRANE, a citizen of the United States, residing at San Francisco, in the county of San Francisco and State of California, have invented certain new and useful Improvements in Peanut-Roasters and Popcorn-Poppers, of which the following is a specification.

My invention relates to improvements in devices for roasting peanuts or chestnuts or for popping popcorn, the object of my invention being to provide an apparatus of this character by means of which chestnuts or peanuts can be roasted without danger of scorching or burning and in like manner popcorn can be popped in small or large quantities without danger of burning.

My invention therefore resides in the novel construction, combination, and arrangement of parts for the above ends hereinafter fully specified, and particularly pointed out in the claims.

In the accompanying drawings, Figure 1 is a plan view of a popcorn-popper constructed in accordance with my invention. Fig. 2 is a side view of the same. Fig. 3 is a cross-section thereof. Fig. 4 is a plan view of a modified form thereof. Fig. 5 is a plan view of a further modification thereof. Fig. 6 is a side view of the latter. Fig. 7 is a side elevation of a peanut or chestnut roaster constructed in accordance with my invention. Fig. 8 is a cross-section thereof.

Popcorn-poppers at present on the market are defective in this respect that it is almost impossible to pop a considerable quantity of popcorn without some portion of it scorching or burning. To prevent this, it is necessary to continually shake the popper to agitate the popcorn therein. Even with this continual agitation a portion of the popcorn is burned. A further objection to present forms of popcorn-poppers is that they cannot be used over a coal-oil or gas stove on account of the odor of the coal-oil or gas affecting the taste of the popcorn. Similar remarks apply to peanut and chestnut roasters.

I have discovered that if the receptacle for the popcorn or the receptacle for the peanuts and chestnuts is made of asbestos there is absolutely no danger of burning or scorching the popcorn or peanuts or chestnuts. The reason of this appears to be that asbestos, being a poor conductor of heat, the surface thereof next the popcorn, while giving up its heat with sufficient rapidity to pop the popcorn, does not give it up with sufficient rapidity to burn or scorch the same. With the ordinary poppers the metal of the vessel in which the popcorn is contained conducts the heat so rapidly that it is almost impossible to maintain the heat of the upper surface of the metal above the temperature required to pop the corn and below the temperature which will burn the same. The same objection applies to metallic peanut-roasters. I have discovered that by making these vessels of asbestos instead of metal this difficulty is overcome.

Referring to the drawings, 1 represents the vessel for popping corn, which is made of asbestos throughout, compressed and molded into shape. In Figs. 1, 2, and 3 said vessel is of an oblong form, while in Figs. 4, 5, and 6 it is of a circular form. The edges of the vessel at the bottom thereof are made rounded or concave without sharp angles, so as to insure that the popcorn turns over and does not lodge in the corners. Said vessel is supported in a metallic frame 2, having a handle 3, and supports 4, extending obliquely from said handle below the vessel.

In the form of the invention shown in Figs. 5 and 6 the vessel is mounted in a metallic frame having a step-pivot 5, pivotally mounted in a socket 6, formed at the center of a gas-heater 7, comprising inner and outer ring burners 8 9, which are supported upon legs 10, said rings being connected by a pipe 11 with any suitable source of supply of gas. The frame 2 has a handle 12, by which the vessel may be rocked upon its pivot to agitate the popcorn.

In all of the above modifications I provide the usual wire screen 13 above the vessel to prevent the popcorn from jumping out when popped.

In Figs. 7 and 8 I have shown the invention as applied to a peanut or chestnut roaster. In this form of the invention the roaster comprises the usual frame or box 14 and a cylindrical vessel 15 rotating therein, said vessel being made of asbestos throughout and being supported in a metallic frame 16, having axles 17, upon which it is rotatably supported in the main frame, and a crank-arm 18, by means of which the vessel is rotated. The cylindrical vessel is divided into two sections hinged together, as shown at 19, and fastened at their free edges, as shown at 20. This permits of the peanuts being inserted and removed.

My invention greatly improves the methods of peanut and chestnut roasting and popcorn-popping in that the attention and care on the part of the operator are greatly reduced; also, the labor of rotating and shaking. The peanut-roaster does not require more than one revolution a minute, and the popcorn-popper needs to be shaken much less than with the old form. Moreover, peanuts roasted in this roaster if left in a closed vessel remain fresh for at least two weeks and do not become tough, as peanuts do in twenty-four hours under the old process. In the present roaster the oil is evaporated without burning, whereas in the old style the oil is burned into the nut. Also in popping popcorn much less time is required than formerly, and the popcorn presents a purer white color and a better appearance.

I claim—

1. In a device of the character described, a vessel adapted to hold popcorn, peanuts, chestnuts or the like composed entirely of asbestos, and a metallic frame around said vessel for supporting the same, substantially as described.

2. In a device of the character described, a vessel for holding popcorn, peanuts, chestnuts or the like made of asbestos compressed and molded into shape, and a metallic frame outside said vessel for supporting the same, substantially as described.

3. A popcorn-popper comprising a vessel entirely composed of asbestos, a metallic frame around the same having a handle, and a step-pivot in the center thereof, in combination with a gas-heater having a socket to receive said step-pivot, legs upon which it is supported and a ring burner around said socket provided with means for supplying gas thereto, substantially as described.

In witness whereof I have hereunto set my hand in the presence of two subscribing witnesses.

W. P. CRANE.

Witnesses:
F. M. WRIGHT,
K. LOCKWOOD-NEVINS.